(12) United States Patent
Kramer

(10) Patent No.: US 9,885,609 B2
(45) Date of Patent: Feb. 6, 2018

(54) GAS TURBINE ENGINE OPTICAL SYSTEM

(71) Applicant: United Technologies Corporation, Hartford, CT (US)

(72) Inventor: Stephen K. Kramer, Cromwell, CT (US)

(73) Assignee: United Technologies Corporation, Farmington, CT (US)

( * ) Notice: Subject to any disclaimer, the term of this patent is extended or adjusted under 35 U.S.C. 154(b) by 256 days.

(21) Appl. No.: 14/719,018

(22) Filed: May 21, 2015

(65) Prior Publication Data

US 2015/0338278 A1    Nov. 26, 2015

Related U.S. Application Data

(60) Provisional application No. 62/002,550, filed on May 23, 2014.

(51) Int. Cl.
| | |
|---|---|
| *G01J 5/00* | (2006.01) |
| *G01J 5/10* | (2006.01) |
| *F01D 25/24* | (2006.01) |
| *F02D 35/02* | (2006.01) |
| *F23N 5/08* | (2006.01) |

(52) U.S. Cl.
CPC ............ *G01J 5/0088* (2013.01); *F01D 25/24* (2013.01); *F02D 35/022* (2013.01); *F23N 5/082* (2013.01); *G01J 5/10* (2013.01); *F05D 2220/32* (2013.01); *F23N 2041/20* (2013.01); *G01J 2005/106* (2013.01); *Y02T 50/677* (2013.01)

(58) Field of Classification Search
CPC ...... G01J 5/0088; G01J 5/10; G01J 2005/106; F01D 25/24; F02D 35/022; F23N 5/082; F23N 2041/20; F05D 2220/32; Y02T 50/677

See application file for complete search history.

(56) References Cited

U.S. PATENT DOCUMENTS

| | | | | |
|---|---|---|---|---|
| 4,557,106 | A * | 12/1985 | Ffowcs Williams | ..... F02C 9/34 431/1 |
| 5,139,412 | A | 8/1992 | Kychakoff et al. | |
| 8,151,571 | B2 * | 4/2012 | Maly | ........................ F02C 9/28 60/39.5 |
| 8,265,851 | B2 * | 9/2012 | Girouard | ................. F01D 17/02 123/429 |

(Continued)

FOREIGN PATENT DOCUMENTS

CA          2060914          8/1992

OTHER PUBLICATIONS

EP search report for EP15168999.9 dated Sep. 29, 2015.

*Primary Examiner* — Christine Sung
(74) *Attorney, Agent, or Firm* — O'Shea Getz P.C.

(57) ABSTRACT

A turbine engine optical system includes a plurality of viewing ports in an engine case that are circumferentially spaced from one-another. At least one optical device is optically coupled to the ports for viewing an internal chamber defined by the engine case and for depicting at least spatial temperature distributions. The chamber may be an exhaust chamber and the controller may have the capability to correlate events in the exhaust chamber to events in an upstream combustor chamber and may thereby adjust operating parameters of a fuel system of the combustor.

17 Claims, 4 Drawing Sheets

(56) References Cited

U.S. PATENT DOCUMENTS

| | | | |
|---|---|---|---|
| 9,002,615 B2* | 4/2015 | Kumar | F02C 9/28 |
| | | | 385/12 |
| 9,134,199 B2* | 9/2015 | Hwang | G01M 15/14 |
| 2002/0066266 A1* | 6/2002 | Maker | F02C 9/26 |
| | | | 60/39.281 |
| 2007/0224559 A1 | 9/2007 | Ni et al. | |
| 2008/0016971 A1* | 1/2008 | Bunce | F01D 21/003 |
| | | | 73/865.5 |
| 2010/0272557 A1 | 10/2010 | Woodmansee et al. | |
| 2015/0323467 A1* | 11/2015 | Wang | G01N 21/766 |
| | | | 436/160 |
| 2015/0330310 A1* | 11/2015 | deGaribody | G01S 17/58 |
| | | | 701/100 |

* cited by examiner

GAS TURBINE ENGINE OPTICAL SYSTEM

This application claims priority to U.S. Patent Appln. No. 62/002,550 filed May 23, 2014.

BACKGROUND

The present application relates to an optical system and more particularly to an optical system for monitoring chambers within a gas turbine engine.

Gas turbine engines include a compressor section that compresses air and a fuel system that delivers a mixture of fuel and the compressed air to a combustor for ignition and thus the production of hot combustion gasses in an annular combustion chamber. During engine operation, anomalies may occur within or downstream of the combustor that may increase emissions of regulated combustion products and/or damage internal engine components such as the turbine section. Such anomalies may include flame-out within the combustor, improper flame temperature, fuel mal-distribution and changes to fuel composition and/or mixture ratios. Without proper detection and mitigation of these and other anomalies, the gas turbine engine may not meet emission standards and may require avoidable maintenance.

SUMMARY

A turbine engine optical system according to one, non-limiting, embodiment of the present disclosure includes a plurality of viewing ports in and circumferentially spaced about an engine case located downstream of a combustor section for depicting the spatial temperature distribution in an annular exhaust chamber defined between the engine case and an exhaust cone; and at least one optical device constructed and arranged to receive depictions through the plurality of viewing ports to detect at least exhaust temperature distributions.

Additionally to the foregoing embodiment, the device includes a controller for receiving a depiction input signal from the at least one optical device, analyzing the input signal, and outputting a control signal to control a parameter affecting combustion in a combustion chamber of the combustor section.

In the alternative or additionally thereto, in the foregoing embodiment, the control signal controls a fuel pump of a fuel system.

In the alternative or additionally thereto, in the foregoing embodiment, the control signal controls a fuel flow control valve of a fuel system.

In the alternative or additionally thereto, in the foregoing embodiment, the control signal controls combustor air flow in a fuel-air mixer.

In the alternative or additionally thereto, in the foregoing embodiment, the device includes a controller for receiving a depiction input signal from the at least one optical device, analyzing the input signal, and storing the data for future reference.

In the alternative or additionally thereto, in the foregoing embodiment, the at least one optical device is a laser absorption spectroscopy device.

In the alternative or additionally thereto, in the foregoing embodiment, the at least one optical device is a sensor array including a plurality of pixels operable to capture the images.

In the alternative or additionally thereto, in the foregoing embodiment, the device includes at least one multispectral mask array located between the respective at least one optical device and the plurality of viewing ports, and an attenuation mask orientated in front of the multispectral mask array for obtaining proper exposure of each of the plurality of pixels.

In the alternative or additionally thereto, in the foregoing embodiment, the multispectral mask array has a plurality of cells with each cell associated with a respective pixel, and each cell is one of a plurality of band-pass filter types with the plurality of band-pass filter types being distributed across the multispectral mask array.

In the alternative or additionally thereto, in the foregoing embodiment, the controller utilizes a depiction reconstruction algorithm to reconstruct a depiction.

In the alternative or additionally thereto, in the foregoing embodiment, each one of the plurality of viewing ports has a dedicated optical device of the at least one optical device.

In the alternative or additionally thereto, in the foregoing embodiment, the at least one optical device is an infrared laser.

A turbine engine according to another, non-limiting, embodiment includes an engine case concentrically orientated to an engine axis; and an optical system including a plurality of viewing ports in the engine case and circumferentially spaced from one-another for depicting a chamber defined in-part by the engine case, at least one optical device optically coupled to each of the plurality of viewing ports, and a controller for reconstructing the depiction of the at least one optical device into a substantially complete reconstructed depiction of the chamber.

Additionally to the foregoing embodiment, the chamber is annular in shape.

In the alternative or additionally thereto, in the foregoing embodiment, the chamber is an exhaust chamber.

In the alternative or additionally thereto, in the foregoing embodiment, the optical system is a laser absorption spectroscopy system.

In the alternative or additionally thereto, in the foregoing embodiment, the optical system is a laser diffraction system.

In the alternative or additionally thereto, in the foregoing embodiment, the optical system is a sensor array imaging system.

A method of monitoring a combustor of a gas turbine engine according to another, non-limiting, embodiment includes the steps of taking depiction of an exhaust chamber located downstream of the combustor; reconstructing the depiction in a controller; and correlating the reconstructed depiction to pre-established events of the combustor.

The foregoing features and elements may be combined in various combination without exclusivity, unless expressly indicated otherwise. These features and elements as well as the operation thereof will become more apparent in light of the following description and the accompanying drawings. It should be understood, however, the following description and figures are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
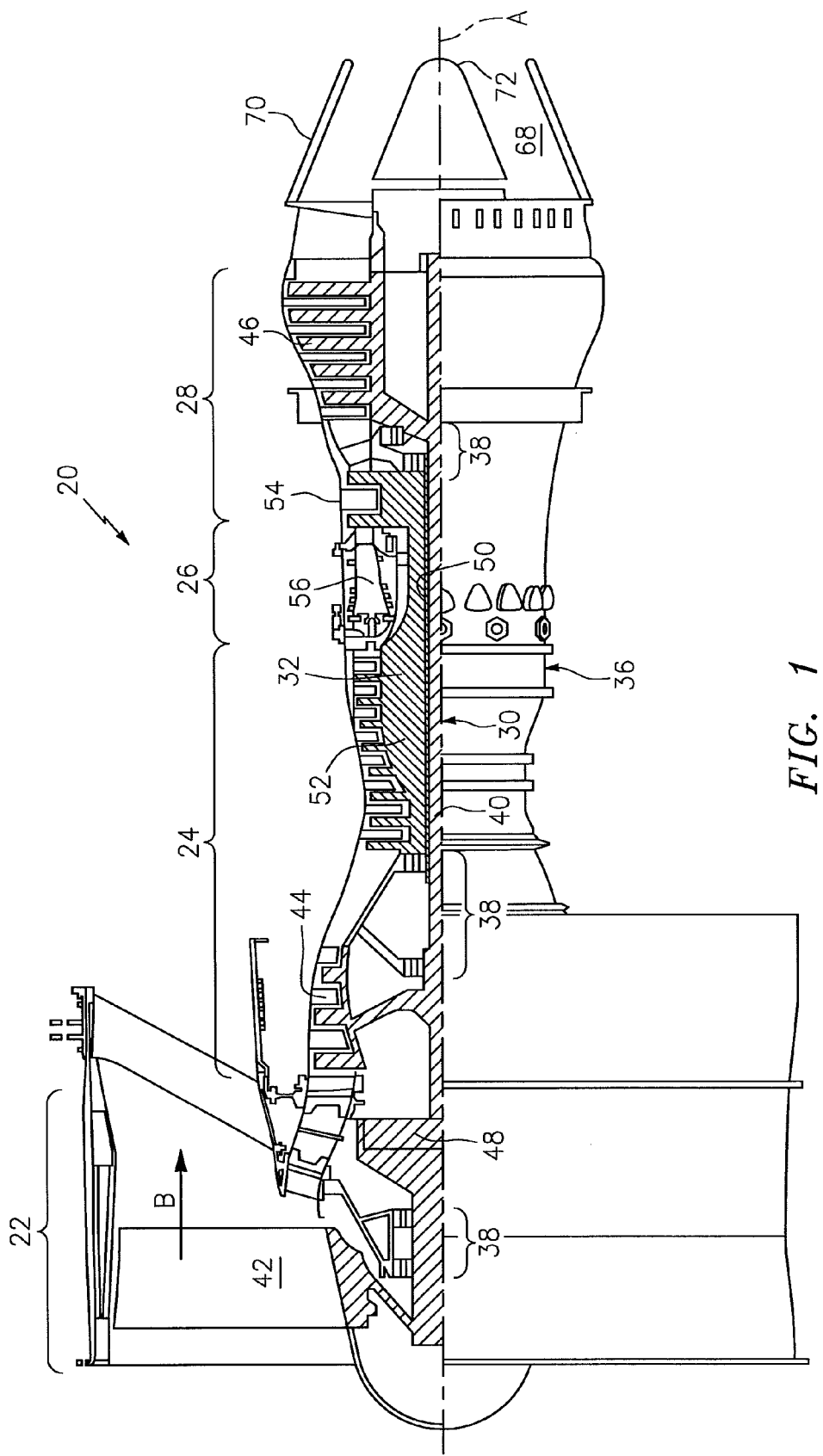
FIG. 1 is a schematic cross section of a gas turbine engine.

FIG. 1 schematically illustrates a gas turbine engine 20 disclosed as a two-spool turbo fan that generally incorporates a fan section 22, a compressor section 24, a combustor section 26 and a turbine section 28. The fan section 22 drives air along a bypass flowpath while the compressor section 24 drives air along a core flowpath for compression and communication into the combustor section 26 then expansion through the turbine section 28. Although depicted as a turbofan in the disclosed non-limiting embodiment, it should be understood that the concepts described herein are not limited to use with turbofans as the teachings may be applied to other types of turbine engine architecture such as turbojets, turboshafts, three-spool turbofans, land-based turbine engines, and others.

The engine 20 generally includes a low spool 30 and a high spool 32 mounted for rotation about an engine axis A via several bearing structures 38 and relative to a static engine case 36. The low spool 30 generally includes an inner shaft 40 that interconnects a fan 42 of the fan section 22, a low pressure compressor 44 ("LPC") of the compressor section 24 and a low pressure turbine 46 ("LPT") of the turbine section 28. The inner shaft 40 drives the fan 42 directly, or, through a geared architecture 48 to drive the fan 42 at a lower speed than the low spool 30. An exemplary reduction transmission may be an epicyclic transmission, namely a planetary or star gear system.

The high spool 32 includes an outer shaft 50 that interconnects a high pressure compressor 52 ("HPC") of the compressor section 24 and a high pressure turbine 54 ("HPT") of the turbine section 28. A combustor 56 of the combustor section 26 is arranged between the HPC 52 and the HPT 54. The inner shaft 40 and the outer shaft 50 are concentric and rotate about the engine axis A. Core airflow is compressed by the LPC 44 then the HPC 52, mixed with the fuel and burned in the combustor 56, then expanded over the HPT 54 and the LPT 46. The LPT 46 and HPT 54 rotationally drive the respective low spool 30 and high spool 32 in response to the expansion.

In one non-limiting example, the gas turbine engine 20 is a high-bypass geared aircraft engine. In a further example, the gas turbine engine 20 bypass ratio is greater than about six (6:1). The geared architecture 48 can include an epicyclic gear train, such as a planetary gear system or other gear system. The example epicyclic gear train has a gear reduction ratio of greater than about 2.3:1, and in another example is greater than about 2.5:1. The geared turbofan enables operation of the low spool 30 at higher speeds that can increase the operational efficiency of the LPC 44 and LPT 46 and render increased pressure in a fewer number of stages.

A pressure ratio associated with the LPT 46 is pressure measured prior to the inlet of the LPT 46 as related to the pressure at the outlet of the LPT 46 prior to an exhaust nozzle of the gas turbine engine 20. In one non-limiting example, the bypass ratio of the gas turbine engine 20 is greater than about ten (10:1); the fan diameter is significantly larger than the LPC 44; and the LPT 46 has a pressure ratio that is greater than about five (5:1). It should be understood; however, that the above parameters are only exemplary of one example of a geared architecture engine and that the present disclosure is applicable to other gas turbine engines including direct drive turbofans.

In one non-limiting example, a significant amount of thrust is provided by the bypass flow path B due to the high bypass ratio. The fan section 22 of the gas turbine engine 20 is designed for a particular flight condition—typically cruise at about 0.8 Mach and about 35,000 feet (10,668 meters). This flight condition, with the gas turbine engine 20 at its best fuel consumption, is also known as Thrust Specific Fuel consumption (TSFC). TSFC is an industry standard parameter of fuel consumption per unit of thrust.

Fan Pressure Ratio is the pressure ratio across a blade of the fan section 22 without the use of a fan exit guide vane system. The low Fan Pressure Ratio according to one, non-limiting, example of the gas turbine engine 20 is less than 1.45:1. Low Corrected Fan Tip Speed is the actual fan tip speed divided by an industry standard temperature correction of $(T/518.7^{0.5})$, where "T" represents the ambient temperature in degrees Rankine. The Low Corrected Fan Tip Speed according to one non-limiting example of the gas turbine engine 20 is less than about 1150 fps (351 m/s).

Figure 2:
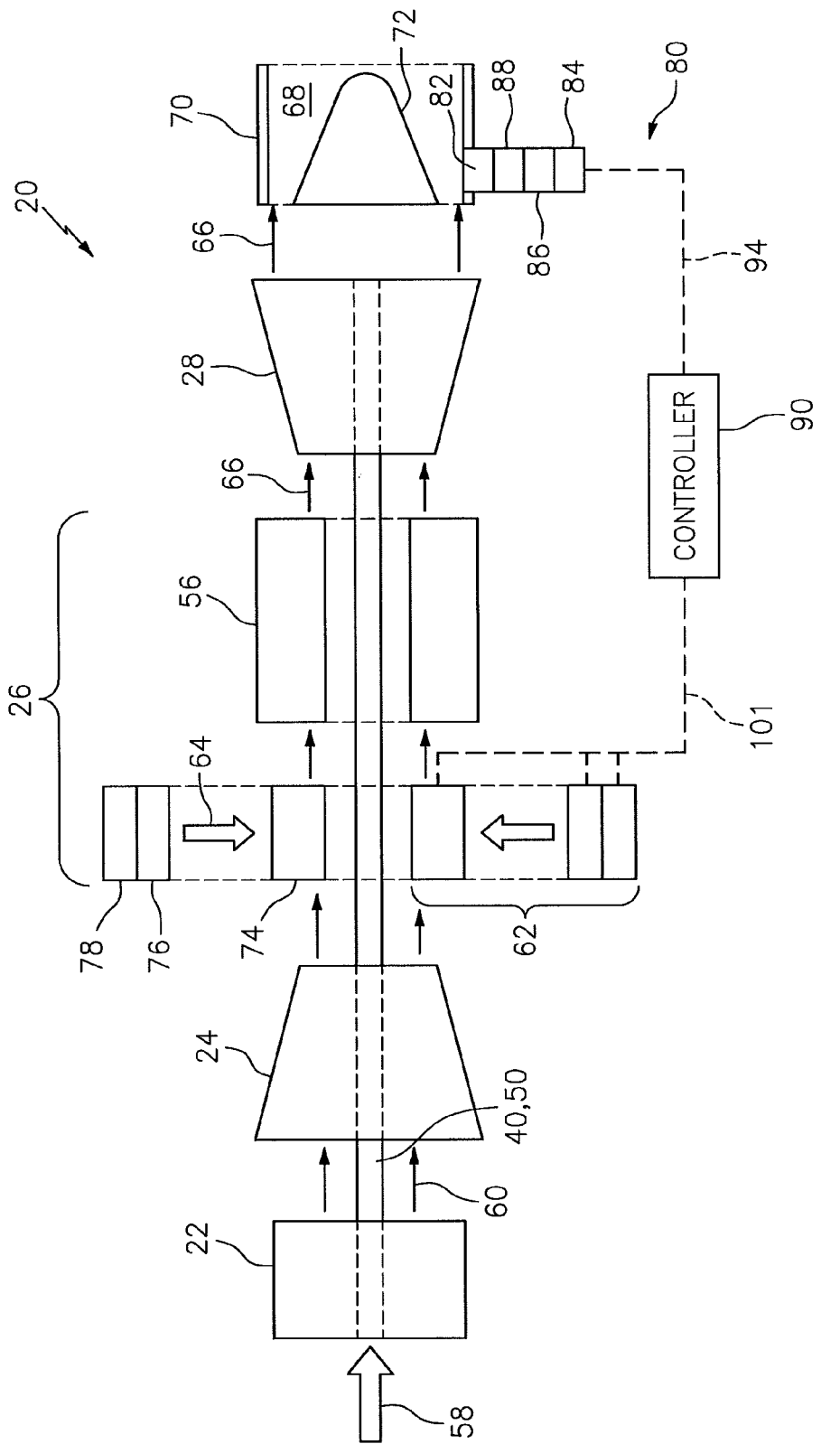
FIG. 2 is a schematic of the gas turbine engine detailing an optical system of the present disclosure.

Referring to FIG. 2, a schematic of the gas turbine engine 20 is illustrated wherein ambient air 58 enters the fan section 22 with an air portion 60 entering the compressor section 24. The pressurized air portion enters a fuel system 62 of the combustor section 26 where at least a portion of pressured air portion mixes with fuel 64 and is injected into a combustion chamber defined by the combustor 56. The combustor 56 ignites and combusts the fuel-and-air mixture, and then passes hot pressurized exhaust gas 66 into the turbine section 28. The exhaust gas 66 passes through the turbine blades and vanes, turning the shafts 40, 50. The gas 66 then exits the turbine section 28 and enters an annular exhaust path or chamber 68 generally defined by a downstream portion of an engine case 70 and an inner exhaust cone 72.

The fuel system 62 may include a fuel-air mixer and/or fuel nozzle 74 that meters and controls the mixture of fuel and air, a servo controlled flow control valve 76 that controls the amount of fuel delivered to the fuel nozzle 74 and/or a fuel pump 78 that provides pressurized fuel 64 to the fuel nozzle 74. The fuel system 62 may be any variety of fuel systems generally known in the art and may include (as examples) fuel nozzles having dedicated, variable speed, pumps; fuel systems having fuel nozzles each having a dedicated flow control valve with or without bypass valves and receiving fuel from a common fuel manifold (not shown) that is pressurized by at least one fuel pump.

Figure 3:
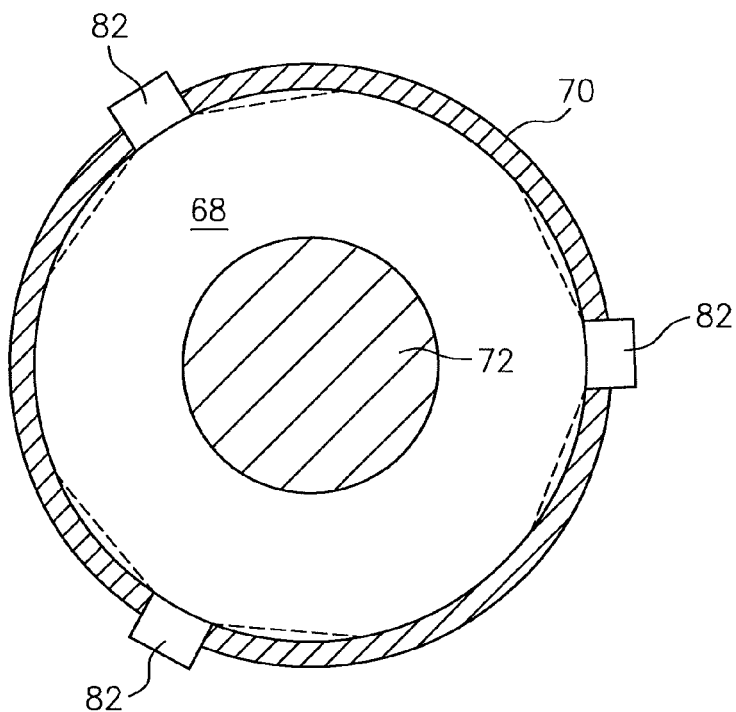
FIG. 3 is a cross section of an exhaust chamber of the engine taken along line 3-3 of FIG. 1.

Referring to FIGS. 2 and 3, an optical system 80 of the turbine engine 20 may include a plurality of viewing ports 82 (three shown), at least one optical device 84, and a controller 90. The viewing ports 82 may be located in and circumferentially spaced about the engine case 70 to view the exhaust gas 66 downstream of the combustor 56. Each viewing port may be of a glass-type, constructed of a heat resistant transparent material such as fused quartz, synthetic sapphire, or others. Although not illustrated, each port 82 may also include a positioning mechanism and/or prism to alter the field of view within the chamber 68. Each viewing port 82 may be optically coupled to a single optical device 84 with multiplexing capability. Alternatively, and as illustrated, each viewing port may be optically coupled to a dedicated optical device 84, or any combinations of the above. The optical device 84 may be a thermal depiction optical device and may include an infrared laser capable of measuring infrared frequencies and intensities for the reconstruction of a spatial temperature distribution by the controller 90. The optical device 84 may further be (or an addition thereto) a laser absorption spectroscopy device (e.g. diode lasers) capable of measuring/identifying specific elements or species in a gas. Yet further, the optical device 84 may be a laser diffraction device capable of measuring at least particle sizes in a gas stream.

Figure 5:
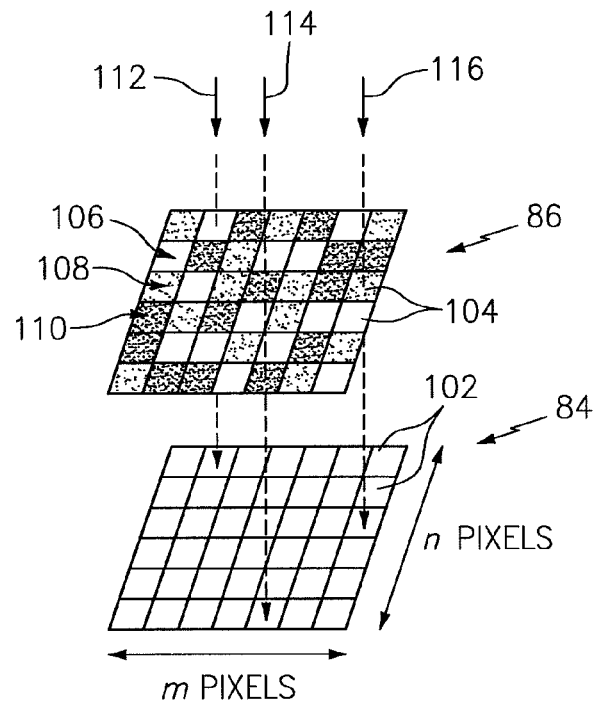
FIG. 5 is a perspective, exploded, view of a sensor and mask array of the optical system.

Alternatively, the optical device 84 may be an imaging device or camera capable of measuring light generally emitted in at least the infrared region. If a camera, and referring to FIG. 5, the camera or sensor array 84 of the optical system 80 may further include a randomly distributed multispectral mask array 86 and a single attenuation mask 88 that may be associated with each sensor array 84. The sensor array 84 may be a digital sensor array such as a CCD/CMOS sensor, or other spectral imaging device as is generally known in the art.

The sensor array 84 may be a focal plane array having a matrix or plurality of imaging, electronic, pixels 102. The multispectral mask array 86 is generally position in front of the sensor array 84 and has a plurality of cells 104 with each cell aligned to a corresponding pixel 102. The mask array 86 may further have a plurality of band-pass filter types 106, 108, 110 (three illustrated) that may be pseudo-randomly distributed amongst the cells 104 (i.e. each cell 104 has one of the three filter types 106, 108, 110). This pseudo-random order provides improved reconstructed images or depictions 98, 100 when used in conjunction with the algorithm 96 of the controller 90.

Each filter type 106, 108, 110 is constructed to pass light emissions having wavelengths that fall within at least one specified wavelength range. Because the signal strength corresponding to one band-pass filter type may appreciably exceed the strength of another, the attenuation filter 88 may be needed to prevent overexposure (or over saturation) at cells 104 passing high signal strengths, and where exposure time is held constant across the sensor array 84. The filter types may also be needed to block out background radiation from surrounding structure.

Figure 4:
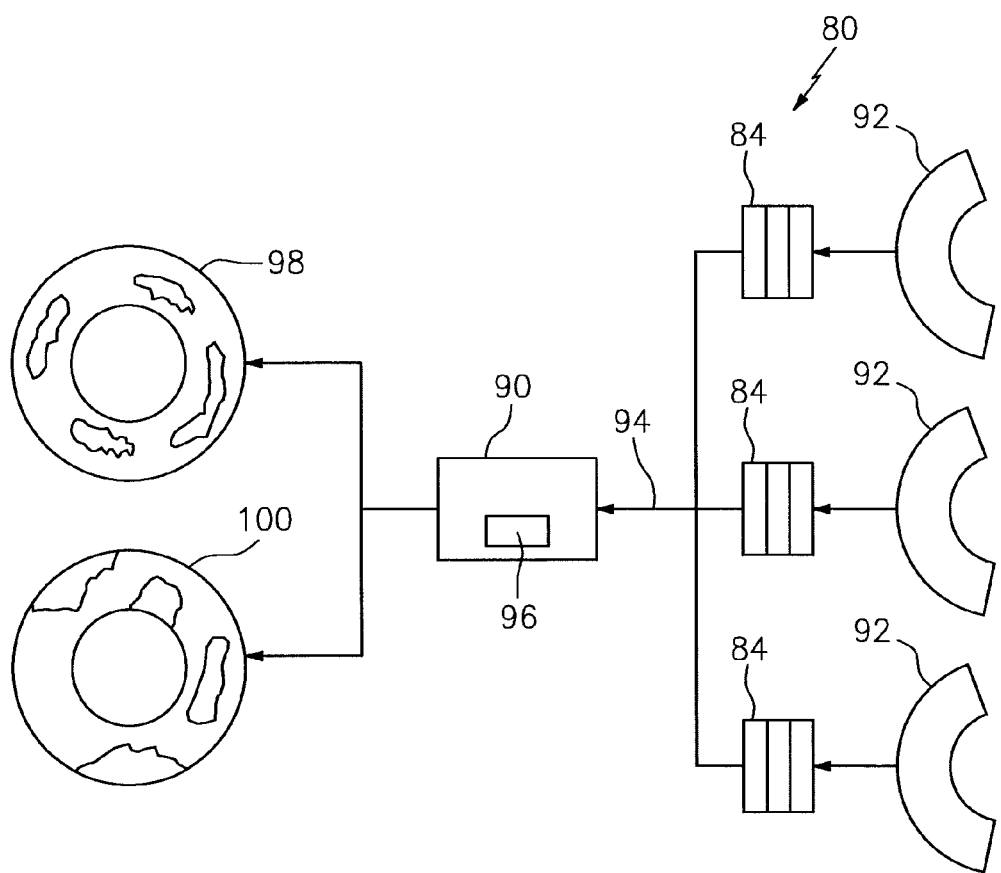
FIG. 4 is a schematic of the optical system.

Referring to FIGS. 2 and 4, the optical system 80 may be constructed to monitor and depict a spatial temperature and/or constituent distribution within a chamber such as the exhaust chamber 68, as one example. Each one of the optical devices 84 operate to take a depiction 92 of a portion of the chamber 68 within the specific optical device's field of view. Each device 84 may then send the depiction 92 as an input signal 94 to the controller or processor 90 that may apply a reconstruction algorithm 96 to reconstruct annular heat or species depiction 98 from the combined depictions 92 generated by each sensor array 84. That is, the heat or species depiction 98 may be a two-dimensional, spatial discriminating, distribution of temperatures or species of interest within the chamber 68. The controller 90 may further reconstruct a constituent depiction 100 that spatially identifies key gaseous components such as carbon dioxide ($CO_2$) and water ($H_2O$), amongst others. The controller 90 may further process an output signal 101 (as dictated by the reconstructed depiction or data 98, 100) sent to other engine control systems and/or components to adjust engine operating parameters as determined by the depictions 92 in the exhaust chamber 68. For example, the reconstructed depictions may be correlated to combustor performance and/or correlated to identify hot streaks in the combustor 56, and one or both of the reconstructed depictions 98, 100 may be generally utilized to take corrective action and control aspects of the fuel system 62 such as the fuel nozzle 74 to adjust air flow, the flow control valve 76 to adjust fuel flow and/or the fuel pump 78.

Alternatively or in combination, the re-constructed depictions 98, 100, or data generally therefrom, may be stored electronically, and used during engine maintenance procedures. For instance, the turbine section 28 operating condition can be monitored. That is and as one example, deterioration of turbine clearances can be monitored knowing that such deterioration may cause the engine 20 to run hotter, yet have areas that are hotter or colder than an initial baseline such as a ring of hot or cold air on an outer diameter circumference. These conditions can be depicted directly or can be correlated to a temperature pattern or profile in the exhaust chamber 68 and thereby identified through the optical system 80.

Referring to FIG. 4, the optical system 80 may communicate with the controller 90 through a wired channel, or alternatively, may be any other optical, wireless, radio channel, or any other type of channel capable of transmitting depictions between two points including links involving the World Wide Web (www) or the internet.

In yet another example, the viewing ports 82 may be in the engine case 70 generally at the combustor 56, spatial distributions of fuel-to-air ratios and heat release in the reaction zone of the combustor can be monitored to control the performance of the combustor section 26 for fuel efficiency and reliability.

The optical system 80 as applied to the combustor 56 may also be applied to any portion of the engine 20 downstream of the combustor. For instance, the device may depict the exhaust chamber 68 and the reconstructed depictions 98, 100, or data thereof, may be correlated to the performance of the combustor thus predicting combustor events that can be adjusted or corrected through output signals 101 of the controller 90.

Figure 6:
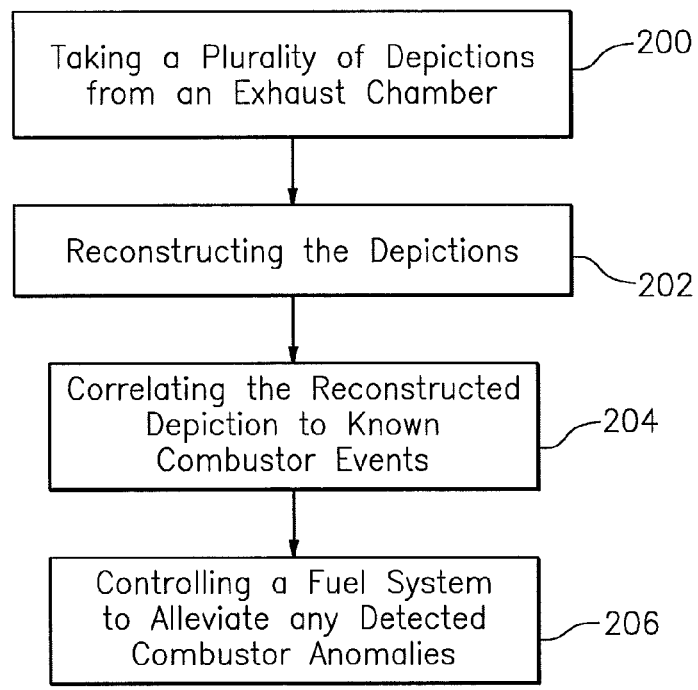
FIG. 6 is a flow chart of a method of monitoring and/or controlling a combustor section.

Referring to FIG. 6, a method of monitoring and/or controlling the combustor section 26 includes the first step 200 of taking depictions 92 of an exhaust chamber 68 through a plurality of viewing ports 82. Then as step 202, utilizing the controller 90 to reconstruct at least one depiction 98, 100 from the plurality of spatially discrete depictions 92. The next step 204 correlates the reconstructed depiction(s) to pre-established events or anomalies of the combustor that may be learned through empirical trials or self-learning algorithms and/or on-board engine control software. As step 206, the controller may generate an output signal 101 to control parameters of the fuel system 62 to alleviate the anomalies.

It is understood that relative positional terms such as "forward," "aft," "upper," "lower," "above," "below," and the like are with reference to the normal operational attitude and should not be considered otherwise limiting. It is also understood that like reference numerals identify corresponding or similar elements throughout the several drawings. It should be understood that although a particular component arrangement is disclosed in the illustrated embodiment, other arrangements will also benefit. Although particular step sequences may be shown, described, and claimed, it is understood that steps may be performed in any order, separated or combined unless otherwise indicated and will still benefit from the present disclosure.

The foregoing description is exemplary rather than defined by the limitations described. Various non-limiting embodiments are disclosed; however, one of ordinary skill in the art would recognize that various modifications and variations in light of the above teachings will fall within the scope of the appended claims. It is therefore understood that within the scope of the appended claims, the disclosure may be practiced other than as specifically described. For this reason, the appended claims should be studied to determine true scope and content.

What is claimed:

1. A turbine engine optical system comprising:
a plurality of viewing ports in and circumferentially spaced about an engine case located downstream of a combustor section for depicting a spatial exhaust temperature distribution in an annular exhaust chamber defined between the engine case and an exhaust cone; and
at least one optical device constructed and arranged to receive depictions through the plurality of viewing ports to detect the spatial exhaust temperature distribution, wherein the at least one optical device includes a sensor array that includes a plurality of pixels operable to capture images;
at least one multispectral mask array located between the respective at least one optical device and the plurality of viewing ports; and
an attenuation mask orientated in front of the at least one multispectral mask array for obtaining proper exposure of each of the plurality of pixels.

2. The turbine engine optical system set forth in claim 1 further comprising:
a controller for receiving a depiction input signal from the at least one optical device, analyzing the depiction input signal, and outputting a control signal to control a parameter affecting combustion in a combustion chamber of the combustor section.

3. The turbine engine optical system set forth in claim 2, wherein the control signal controls a fuel pump of a fuel system.

4. The turbine engine optical system set forth in claim 2, wherein the control signal controls a fuel flow control valve of a fuel system.

5. The turbine engine optical system set forth in claim 2, wherein the control signal controls combustor air flow in a fuel-air mixer.

6. The turbine engine optical system set forth in claim 1 further comprising:
a controller for receiving a depiction input signal from the at least one optical device, analyzing the input signal, and storing the data for future reference.

7. The turbine engine optical system set forth in claim 6, wherein the controller utilizes a depiction reconstruction algorithm to reconstruct a depiction.

8. The turbine engine optical system set forth in claim 7, wherein each one of the plurality of viewing ports has a dedicated optical device of the at least one optical device.

9. The turbine engine optical system set forth in claim 1, wherein the at least one optical device is a laser absorption spectroscopy device.

10. The turbine engine optical system set forth in claim 1, wherein the multispectral mask array has a plurality of cells with each cell associated with a respective pixel, and each cell is one of a plurality of band-pass filter types with the plurality of band-pass filter types being distributed across the multispectral mask array.

11. The turbine engine optical system set forth in claim 1, wherein the at least one optical device includes an infrared laser.

12. A turbine engine comprising:
an engine case concentrically orientated to an engine axis; and
an optical system including
a plurality of viewing ports in the engine case and circumferentially spaced from one-another for depicting a chamber defined in-part by the engine case,
at least one optical device optically coupled to each of the plurality of viewing ports, where the at least one optical device includes a sensor array that includes a plurality of pixels operable to capture images,
a controller for reconstructing the depiction of the at least one optical device into a substantially complete reconstructed depiction of the chamber,
at least one multispectral mask array located between the respective at least one optical device and the plurality of viewing ports; and
an attenuation mask orientated in front of the at least one multispectral mask array for obtaining proper exposure of each of the plurality of pixels.

13. The turbine engine set forth in claim 12, wherein the chamber is annular in shape.

14. The turbine engine set forth in claim 13, wherein the chamber is an exhaust chamber.

15. The turbine engine set forth in claim 13, wherein the optical system includes a laser absorption spectroscopy system.

16. The turbine engine set forth in claim 13, wherein the optical system includes a laser diffraction system.

17. The turbine engine set forth in claim 13, wherein the optical system includes a sensor array imaging system.

* * * * *